United States Patent
Wang et al.

(10) Patent No.: US 11,902,847 B2
(45) Date of Patent: Feb. 13, 2024

(54) DYNAMIC VOICE AND DATA MODE SELECTION

(71) Applicant: Google LLC, Mountain View, CA (US)

(72) Inventors: Jibing Wang, San Jose, CA (US); Erik Richard Stauffer, Sunnyvale, CA (US); Nicholas M. McDonnell, Western Springs, IL (US); Sathish Karunakaran, Los Altos, CA (US)

(73) Assignee: Google LLC, Mountain View, CA (US)

( * ) Notice: Subject to any disclaimer, the term of this patent is extended or adjusted under 35 U.S.C. 154(b) by 266 days.

(21) Appl. No.: 17/294,971

(22) PCT Filed: May 16, 2019

(86) PCT No.: PCT/US2019/032564
§ 371 (c)(1),
(2) Date: May 18, 2021

(87) PCT Pub. No.: WO2020/231434
PCT Pub. Date: Nov. 19, 2020

(65) Prior Publication Data
US 2022/0014996 A1  Jan. 13, 2022

(51) Int. Cl.
*H04W 36/30* (2009.01)
*H04W 36/14* (2009.01)
(Continued)

(52) U.S. Cl.
CPC .......... *H04W 36/30* (2013.01); *H04W 36/14* (2013.01); *H04W 36/20* (2013.01); *H04W 88/06* (2013.01)

(58) Field of Classification Search
CPC ..... H04W 36/30; H04W 36/14; H04W 36/20; H04W 88/06
See application file for complete search history.

(56) References Cited

U.S. PATENT DOCUMENTS 5,396,539 A * 3/1995 Slekys ................ H04W 72/542
                                                                                 455/448
8,890,921 B2 * 11/2014 Rawat ...................... H04N 7/14
                                                                                 348/14.02
(Continued)

FOREIGN PATENT DOCUMENTS

| CN | 105024988 A | 11/2015 |
| EP | 1388951 | 2/2004 |
| WO | 2020231434 | 11/2020 |

OTHER PUBLICATIONS

"International Preliminary Report on Patentability", Application No. PCT/US2019/032564, dated Nov. 16, 2021, 10 pages.
(Continued)

*Primary Examiner* — Julio R Perez

(57) ABSTRACT

A computing device is described for performing local interference avoidance, when supporting concurrent voice and data transmissions, and with access to multiple radios. The computing device predicts when coexistence issues will occur from maintaining independent voice and data transmissions using separate radios. To avoid local interference issues, the computing device automatically switches to operating a different combination of radios, making local interference less likely to occur. In some cases, the computing device may consolidate the voice and non-voice data exchanges to occur using a single radio. In some cases, rather than consolidation, the computing device may move the voice or the non-voice data exchange to a different radio as a way to avoid the local interference.

20 Claims, 5 Drawing Sheets

(51) Int. Cl.
*H04W 36/20* (2009.01)
*H04W 88/06* (2009.01)

(56) References Cited

U.S. PATENT DOCUMENTS

| | | | |
|---|---|---|---|
| 9,467,865 B2 | 10/2016 | Joshi et al. | |
| 2004/0029619 A1 | 2/2004 | Liang et al. | |
| 2005/0148353 A1* | 7/2005 | Hicks, III | H04M 3/42246 455/552.1 |
| 2013/0308608 A1* | 11/2013 | Hu | H04W 88/06 370/334 |
| 2015/0139015 A1 | 5/2015 | Kadous et al. | |
| 2017/0238167 A1 | 8/2017 | Zhang et al. | |
| 2020/0389558 A1* | 12/2020 | Li | H04W 36/14 |
| 2021/0029241 A1* | 1/2021 | Zheng | H04W 8/22 |
| 2021/0227376 A1* | 7/2021 | Jha | H04W 76/27 |
| 2021/0298106 A1* | 9/2021 | Jha | H04W 76/16 |

OTHER PUBLICATIONS

"International Search Report and Written Opinion", PCT Application No. PCT/US2019/032564, dated Jul. 19, 2019, 17 pages.

"PLMN Selection in LTE (Idle Mode Action)", Techplayon, Apr. 25, 2019, 4 pages.

Lin, et al., "Public Land Mobile Network Selection During International Roaming", Technical Disclosure Commons; Retrieved from https://www.tdcommons.org/dpubs_series/2562, Oct. 14, 2019, 13 pages.

Pyles, et al., "Bluesaver: A Multi-PHY Approach to Smartphone Energy Savings", IEEE Transactions on Wireless Communications vol. 14, No. 6, Jun. 2015, 11 pages.

Translation of Chinese Office Action dated Sep. 26, 2023 for CN Application No. 201980095302.2, 21 pages.

* cited by examiner

DYNAMIC VOICE AND DATA MODE SELECTION

RELATED APPLICATION

This application is a national stage entry of International Application No. PCT/US2019/032564, filed May 16, 2019, the disclosure which is incorporated herein by reference in its entirety.

BACKGROUND

Some wireless computing devices operate multiple radios to maintain concurrent connections with more than one wireless network. For example, for improved connectivity, a mobile telephone often includes a cellular radio and a Wi-Fi® radio and can conduct voice calls and exchange data over both, simultaneously. However, maintaining connectivity using multiple radios in this way can lead to local interference between the radios. This local interference can degrade link quality and reduce quality of service.

SUMMARY

A computing device is described for performing local interference avoidance, when supporting concurrent voice and data transmissions, and with access to multiple radios. The computing device predicts when coexistence issues will occur from maintaining independent voice and data transmissions using separate radios. To avoid local interference issues and maintain high link quality and quality of service, the computing device automatically switches to (e.g., or biases) a radio selection policy to make it more likely that the computing device is operating a different combination of radios, making local interference less likely to occur. In some cases, the computing device may consolidate the voice and non-voice data exchanges onto a single radio. In other cases, the computing device may move the voice or the non-voice data exchange to a different radio to avoid the local interference.

In one embodiment, a method is described for avoiding local interference between first and second radios of a computing device. The method includes exchanging voice data using the first radio and exchanging non-voice data using the second radio. Based on determining that exchanging the voice data using the first radio concurrently with exchanging the non-voice data using the second radio produces the local interference between the first and second radios, the method further includes avoiding the local interference between the first and second radios by switching from using the second radio to using a different radio to exchange the non-voice data.

In another embodiment a computing device is described. The computing device includes a first radio, a second radio, and a processor and memory system coupled to the first and second radios. The processor and memory system include instructions that are executable by the processor to configure the computing device to avoid local interference between first and second radios by exchanging voice data using the first radio and exchanging non-voice data using the second radio. Based on determining that exchanging the voice data using the first radio concurrently with exchanging the non-voice data using the second radio produces the local interference between the first and second radios, the instructions, when executed, further configure the computing device to avoid the local interference between the first and second radios by switching from using the second radio to using a different radio to exchange the non-voice data.

In yet another embodiment a computer-readable storage medium is described including instructions, that, when executed by a processor of a computing device, configure the computing device to avoid local interference between first and second radios of the computing device. The instructions, when executed, configure the computing device to avoid the local interference by exchanging voice data using the first radio, and exchanging non-voice data using the second radio. Based on determining that exchanging the voice data using the first radio concurrently with exchanging the non-voice data using the second radio produces the local interference between the first and second radios, the instructions, when executed, further configure the computing device to avoid the local interference between the first and second radios by switching from using the second radio to using a different radio to exchange the non-voice data.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of local interference avoidance are described below. The use of the same reference numbers in different instances in the description and the figures indicate similar elements.

DETAILED DESCRIPTION

Figure 1:
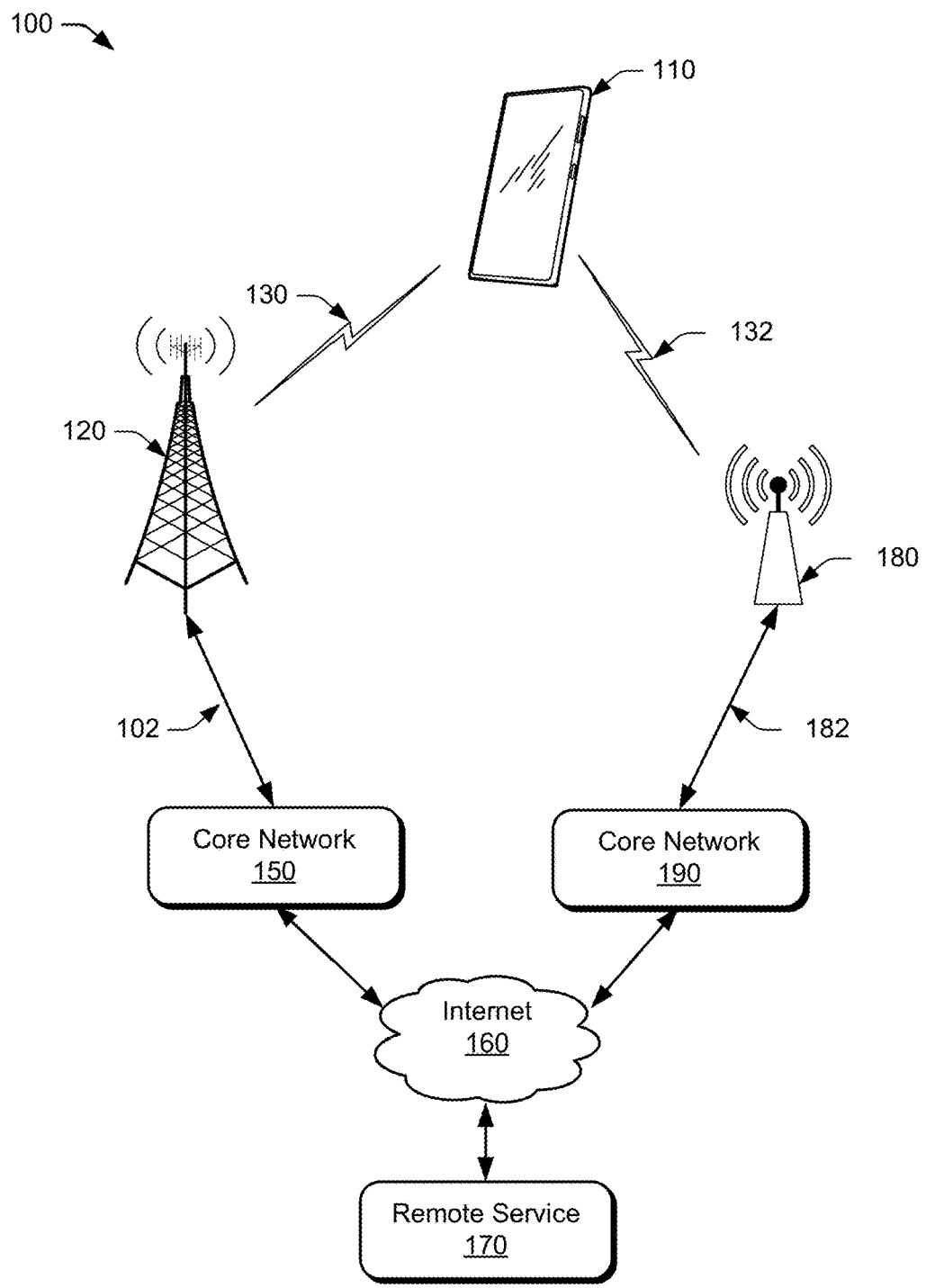
FIG. 1 illustrates an example operating environment in which a computing device may perform local interference avoidance.

Some wireless computing devices operate multiple radios to maintain concurrent connections with more than one wireless network. For example, for improved portability and connectivity to the Internet, a mobile telephone often includes a cellular radio and a Wi-Fi® radio and the mobile telephone is capable of exchanging information with both, simultaneously. However, operating multiple radios concurrently can produce local interference between the radios, e.g., if the radios communicate on similar frequencies. For example, using a Long-Term Evolution (LTE) radio for supporting a voice call, while concurrently using a Wi-Fi® radio for non-voice transmissions, can produce local interference between the radios, particularly when the two radios communicate on similar (e.g., ~2 Hz) frequencies. This "local interference" can degrade link quality, resulting in reduced bandwidth, missed communications, or otherwise poor performance.

A computing device is described for performing local interference avoidance, when supporting concurrent voice and non-voice transmissions, and with access to multiple radios. The computing device predicts when coexistence issues will occur from maintaining independent voice and non-voice data exchanges using separate radios. To avoid local interference issues, the computing device automatically switches to (e.g., or biases a radio selection policy to make it more likely that the computing device is) operating one or more different radios, that minimize the chance that local interference from concurrent voice and non-voice data exchanges, will occur.

For example, instead of using one radio for voice data and a different, interfering radio for non-voice data, the computing device may avoid some local interference issues by communicating both the voice and the non-voice data, using a single radio that can support the concurrent transmissions. Alternatively, the computing device may switch to using a different, third radio for either the voice or non-voice data exchange as a way to prevent local interference. For example, although possible to use a LTE cellular radio to support a voice call while simultaneously using a Wi-Fi® radio to support a data exchange, the computing device may improve link quality and quality of service by relying on just the LTE radio for the voice and the non-voice data, when local interference between the two radios is predicted to be intolerable (e.g., due to sometimes shared transmission frequencies in or around 2.4 GHz). Alternatively, the computing device may improve link quality and quality of service by relying on a different combination of radios, such as a different Wi-Fi® radio that operates on a different frequency that is less similar to the operating frequency of LTE. For example, the computing device may switch from using a 2.4 GHz to using a 5 Ghz Wi-Fi® radio to minimize interference to the voice call over a ~2 GHz wireless LTE link.

The computing device may overcome challenges in ensuring link quality and quality of service while supporting concurrent voice and non-voice transmissions. By performing local interference avoidance, the computing device can reduce coexistence issues (local interference) generated between competing radios communicating concurrently, on similar frequencies. By selectively consolidating or otherwise rearranging otherwise interfering communications when local interference is expected, the computing device may operate with improved link quality and quality of service.

While described in the context of a Wi-Fi® radio and a Bluetooth™ radio, the following techniques are applicable to other types of wireless local access network (WLAN) and other radio access network (RAN) type radios. For example, it is understood that a Wi-Fi® radio is one example of a WLAN radio just as a Bluetooth™ radio is one example of a RAN radio, and therefore the techniques are applicable to WLAN and RAN radios in general, even where in specific examples, Wi-Fi® and Bluetooth™ may be used.

Example Environments

FIG. 1 illustrates an example operating environment in which a computing device may perform local interference avoidance. FIG. 1 illustrates an example environment 100, which includes computing device 110, which can communicate with base station 120 through wireless communication link 130 and can further communicate with wireless access point 180 through wireless communication link 132.

For simplicity, the computing device 110 is implemented as a smartphone but may be implemented as any suitable computing or electronic device, such as a smart watch, a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator.

The base station 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof. The wireless access point 180 is any networking hardware device that enables other Wi-Fi® enabled devices to connect to a wired network, such as the core network 190.

The base station 120 communicates with the computing device 110 using the wireless link 130 and the wireless access point 180 communicates with the computing device 110 using the wireless link 132. The wireless links 130 and 132 may each be implemented as any suitable type of wireless link. The wireless links 130 and 132 include control and data communication, such as downlink of data and control information (e.g., communicated from the base station 120 to the computing device 110), uplink of other data and control information (e.g., communicated from the computing device 110 to the base station 120), or both.

The base station 120 is connected to a core network 150. The base station 120 connects, at 102, to the core network 150 through an NG2 interface for control-plane signaling and using an NG3 interface for user-plane data communications when connecting to a 5G core network or using an $S_1$ interface for control-plane signaling and user-plane data communications when connecting to an Evolved Packet Core (EPC) network. The base station 120 can communicate using an Xn Application Protocol (XnAP) through an Xn interface or using an X2 Application Protocol (X2AP) through an X2 interface to exchange user-plane and control-plane data. The computing device 110 may connect, via the core network 150, to public networks, such as the Internet 160 to interact with a remote service 170.

The wireless access point 180 is connected to a core network 190. The wireless access point 180 connects, at 182, to the core network 190 through an Ethernet interface. The wireless access point 180 can communicate using an Ethernet protocol through the Ethernet interface to exchange data with the core network 190. The computing device 110 may connect, via the core network 190, to the same public networks connected to via the core network 150, such as the Internet 160 and the remote service 170.

The computing device 110 performs techniques for avoiding local interference between first and second radios, for example, to improve quality of service of voice calls. The computing device 110 may send and receive voice data over the wireless link 130 using a cellular radio of the computing device 110, such as a 3rd Generation Partnership Project Long-Term Evolution (3GPP LTE) radio, a Fifth Generation New Radio (5G NR) radio, and so forth. The computing device 110 may send and receive non-voice data over the wireless link 132 using a Wi-Fi® radio of the computing device 110, including any radio configured to communicate based on the Institute of Electrical and Electronic Engineers (IEEE) 802.11 standards.

The concurrent transmissions from the computing device 110 may induce local interference between the Wi-Fi® radio and the cellular radio, which may cause interruptions, dropped or missed calls, or otherwise reduce link quality of the wireless link 130 leading to a reduction in quality of service of a voice call. Based on determining that sending the voice data using the cellular radio concurrently with sending the non-voice data using the Wi-Fi® radio induces local interference between the cellular and Wi-Fi® radios, the computing device 110 may avoid the local interference between the cellular and Wi-Fi® radios by switching to using either the cellular radio or the Wi-Fi® radio alone, or by switching to using a different radio or combination of radios entirely, for concurrently sending the voice data and the non-voice data.

By dynamically reconfiguring transmission resources to minimize local interference, particularly during voice calls, the computing device 110 may ensure adequate link quality and quality of service while supporting concurrent voice and non-voice data exchanges. By performing local interference avoidance, the computing device 110 can reduce coexistence issues (local interference) generated between radios concurrently communicating, on similar frequencies. By selectively consolidating or otherwise managing radios to avoid local interference when local interference is expected, the computing device 110 may operate with improved link quality and quality of service.

Example Device

Figure 2:
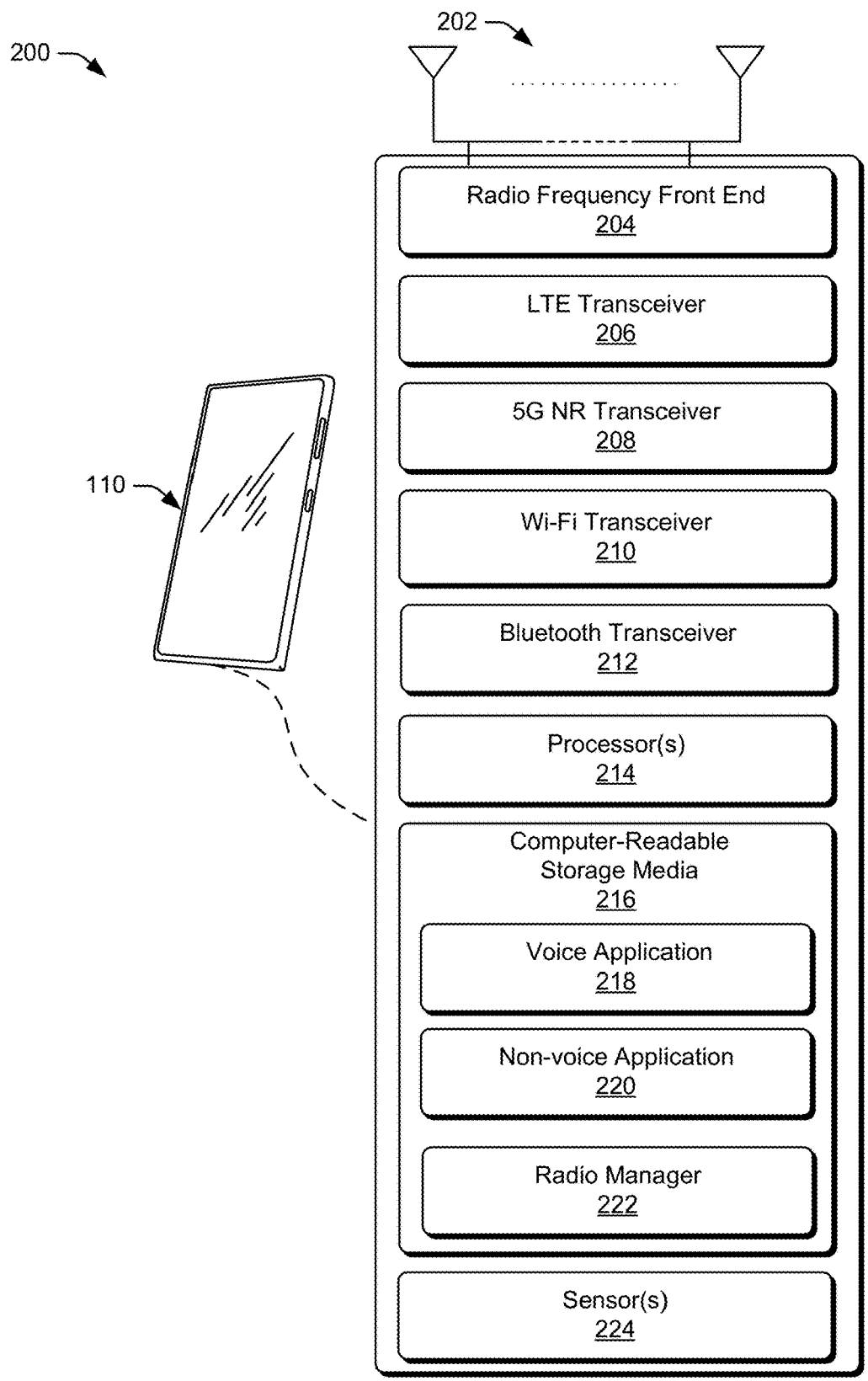
FIG. 2 illustrates an example device diagram of a computing device that can implement various aspects of local interference avoidance.

FIG. 2 illustrates an example device diagram 200 of a computing device that can implement various aspects of local interference avoidance. Included in FIG. 2 is the computing device 110. The computing device 110 may include additional components and interfaces that are omitted from FIG. 2 for the sake of clarity.

The computing device 110 includes antennas 202, a radio frequency front end 204 (RF front end 204), and radios 206, 208, 210, and 212 for communicating over one or more local wireless networks (e.g., wireless local area network (WLAN), Bluetooth™, sonar, radar, lidar, Near Field Communication (NFC), a wireless personal area network (WPAN), Wi-Fi-Direct, IEEE 802.15.4, ZigBee, Thread, mmWave). For example, the radios 206, 208, 210, and 212 include, respectively, an LTE transceiver, a 5G NR transceiver, a Wi-Fi® transceiver, and a Bluetooth™ transceiver. The radios 206, 208, 210, and 212 may include other types of radios for connecting to other wireless local access networks and radio access networks alike. The RF front end 204 of the computing device 110 can couple or connect the radios 206, 208, 210, and 212 to the antennas 202 to facilitate various types of wireless communication.

The antennas 202 of the computing device 110 may include an array of multiple antennas that are configured similar to or differently from each other. The antennas 202 and the RF front end 204 can be tuned to, and/or be tunable to, one or more frequency bands defined by the Bluetooth™, the Wi-Fi®, the LTE and the 5G NR communication standards and implemented by the radios 206, 208, 210, and 212. Additionally, the antennas 202, the RF front end 204, the radios 206, 208, 210, and 212 may be configured to support beamforming for the transmission and reception of communications with the base station 120 and the wireless access point 180. By way of example and not limitation, the antennas 202 and the RF front end 204 can be implemented for operation in sub-gigahertz bands, sub-6 GHz bands, and/or above 6 GHz bands that are defined by Bluetooth™, Wi-Fi®, LTE, and/or 5G NR communication standards. In addition, the RF front end 204 can be tuned to, and/or be tunable to, one or more frequency bands defined and implemented by the local wireless network radio 210 to support transmission and reception of communications with other devices in a coordination set over a local wireless network.

The computing device 110 includes sensor(s) 224 that can be implemented to detect various properties such as movement, temperature, supplied power, power usage, battery state, or the like. As such, the sensors 224 may include any one or a combination of temperature sensors, thermistors, battery sensors, movement sensors, location sensors, and power usage sensors.

The computing device 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data of the computing device 110. The device data includes user data, multimedia data, beamforming codebooks, applications, and/or an operating system of the computing device 110, which are executable by processor(s) 214 to enable user-plane communication, control-plane signaling, and user interaction with the computing device 110.

The CRM includes a voice application 218 and a non-voice application 220. The voice application 218, when executed by the processors 214, causes voice data (e.g., voice over Internet Protocol data) to be sent to and received from the Internet 160 using any available radio from the LTE radio 206, the 5G NR radio 208, the Wi-Fi® radio 210, and the Bluetooth™ radio 212. Similarly, the non-voice application 220, when executed by the processors 214, causes non-voice data (e.g., other, non-Voice over Internet Protocol data) to be sent to and received from the Internet 160 using any available radio from the LTE radio 206, the 5G NR radio 208, the Wi-Fi® radio 210, and the Bluetooth™ radio 212.

The CRM 216 includes a radio manager 222. Alternately or additionally, the radio manager 222 may be implemented in whole or part as hardware logic or circuitry integrated with or separate from other components of the computing device 110. In at least some aspects, the radio manager 222 configures the RF front end 204, the LTE radio 206, the 5G NR radio 208, the Wi-Fi® radio 210, and the Bluetooth™ radio 212 to implement the techniques described herein.

The radio manager 222 is configured to identify situations where local interference amongst the radios 206, 208, 210, and 212 may occur and use a different grouping of the radios 206, 208, 210, and 212 in the interest of preserving link quality, particularly for voice calls. For example, the radio manager 222 may bias a selection algorithm to cause the computing device 110 to select one particular radio over the other radios 206, 208, 210, and 212, for voice data exchanges.

The radio manager 222 may execute a model (e.g., machine-learned model, parametric model) configured to determine circumstances when combinations of the radios 206, 208, 210, or 212 are likely to cause local interference and degrade link quality, particularly for voice calls. The model may be a machine-learned model trained on historical data indicative of what configurations of the radios 206, 208, 210, or 212, or other similar configurations of other computing devices, produced local interference. The model may be a parametric model manually programmed to detect when the radios 206, 208, 210, and 212 are likely to interfere with each other, e.g., by executing rules specifying various combinations of data types, operating powers, operating frequencies, and such, to utilize to avoid local interference. The radio manager 222 executes the rules to implement the local interference avoidance process.

The radio manager 222 may determine the occurrence of local interference between first and second radios, in one of several ways. In some cases, the radio manager 222 determines local interference based on configuration settings of a first and second radio. In some cases, the radio manager 222 determines local interference based on scheduling information of a first and second radio.

For example, the radio manager 222 may perform an interference assessment from configuration information the radio manager obtains via a programming interface to the radios. The radio manager 222 can use the Reference Signal Received Power (RSRP) of the LTE radio 206 as a signal for determining how much local interference that radios 208, 210, and 212 may expect to encounter. The radio manager 222 can use semi-persistent scheduling of the LTE radio 206 as a signal for determining when local interference might impact the radios 208, 210, and 212. Based on the interference assessment, the radio manager 222 can direct the computing device 110 to reconfigure the radios 206, 208, 210, and 212, to avoid local interference.

The radio manager 222 may determine local interference in still other ways. For example, the radio manager 222 can determine the noise floor or other signal quality metric to determine the local interference. The radio manager 222 may measure noise during a period of time when one or more of the radios 206, 208, 210, and 212 is not expected to receive a signal and use the noise measurement (e.g., a noise floor measured in decibels) as starting point for determining local interference for an entire receiver chain (including the radios 206, 208, 210, and 212). The radio manager 222 can determine other signal characteristics to determine the local interference as well, including but not limited, using output power of the radios 206, 208, 210, 212, received signal strength, channel settings, signal-to-noise measurements, and other characteristics of the radios 206, 208, 210, 212.

Example Implementations

Figure 3:
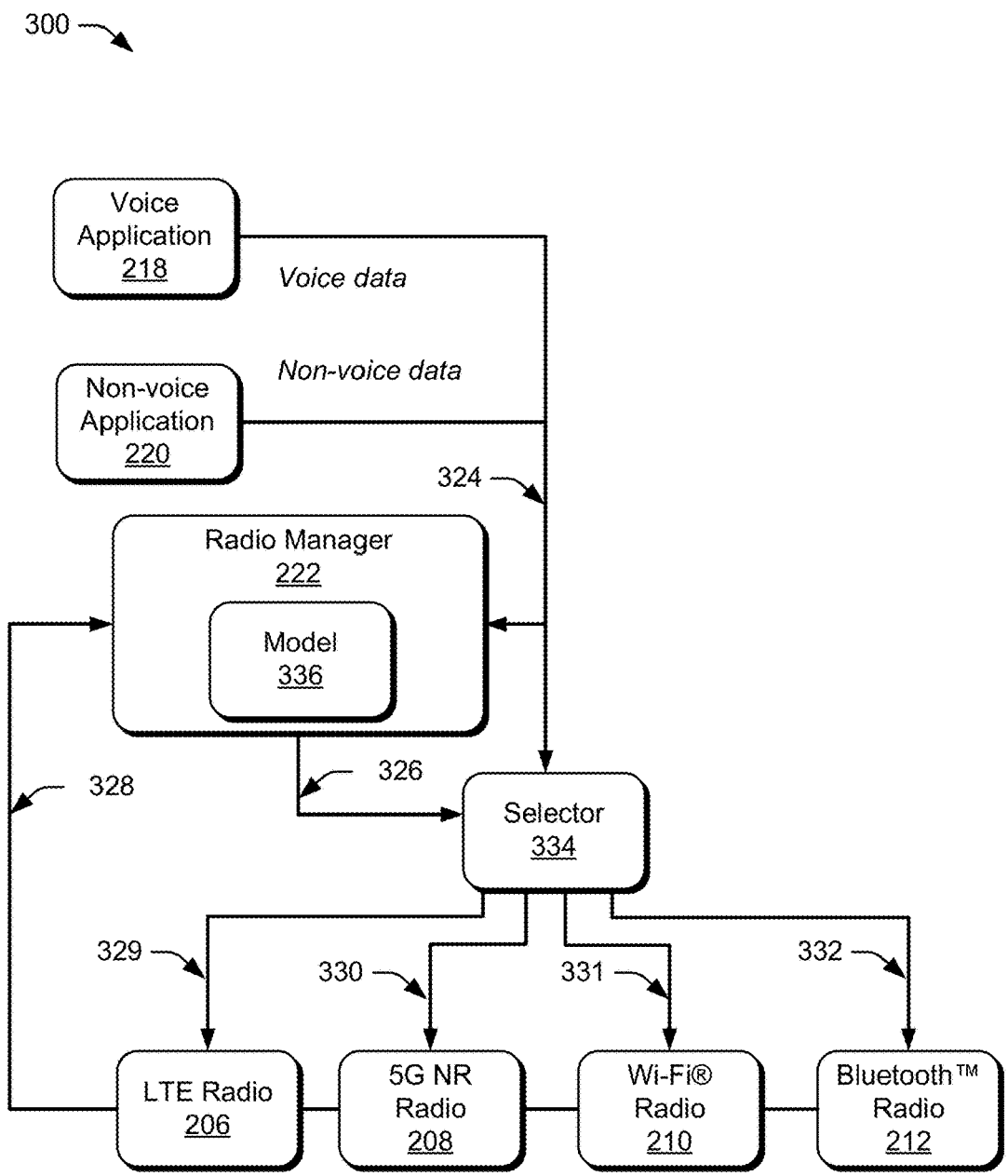
FIG. 3 illustrates an example system diagram for implementing local interference avoidance.

FIG. 3 illustrates an example system diagram for implementing local interference avoidance. System 300, as shown in FIG. 3, may be part of an operating system or other system level component and includes an interface 324 between the voice application 218, the non-voice application 220, the radio manager 222, and a selector 334. An interface 328 of system 300 couples the radio manager 222 to a respective diagnostic or programming interface of each of the LTE radio 206, the 5G NR radio 208, the Wi-Fi® radio 210, and the Bluetooth™ radio 212. Each of the LTE radio 206, the 5G NR radio 208, the Wi-Fi® radio 210, and the Bluetooth™ radio 212 shares with the selector 334, a respective interface 329, 330, 331, or 332 of system 300. The radio manager 222 is configured to control the selector 334 through system 300 to redirect voice and non-voice data, to avoid local interference between the radios 206, 208, 210, and 212, and to improve quality of service through improved link quality.

The selector 334 is configured to select a radio from amongst the radios 206, 208, 210, and 212 any time that the voice application 218 and the non-voice application 220 need to transmit voice and non-voice data. The selector 334 routes the voice or non-voice data through the system 300, using an appropriate one or more of the interfaces 329, 330, 331, and 332. The selector 334 may determine which of the radios 206, 208, 210, and 212 to use, to exchange the voice and the non-voice data, depending on various information, including operating system (OS) settings, user preferences, network/radio availability, and the like. The selector 334 may further select a radio from amongst the radios 206, 208, 210, and 212 to transmit the voice and the non-voice data based on other factors, such as biasing signals from the radio manager 222.

The selector 334 is configured to select the radio, based on information received from the radio manager 222. The selector 334 is directly coupled to the radio manager 222 at the interface 326. From the interface 326, the radio manager 222 can send information or a signal to bias the selector 334 into selecting one radio, over all the other radios 206, 208, 210, and 212.

The radio manager 222 determines the biasing information or signal based on the data contained on the interface 324 as well as based on information the radio manager 222 obtains from the radios 206, 208, 210, and 212 via the interface 328. The radio manager 222 identifies when local interference between the radios 206, 208, 210, and 212 may degrade voice or data transmissions and communicates with the selector 334 to reconfigure the radios 206, 208, 210, and 212 to improve link quality in such situations.

For example, the voice application 218 and the non-voice application 220 may execute concurrently, including transmitting and receiving data using the radios 206, 208, 210, and 212. Initially, the selector 334 may forward the voice data to the LTE radio 206 for transmission. The non-voice application 220 may output non-voice data onto the interface 324 and the selector 334 may select between the radios 206, 208, 210, and 212 to transmit the non-voice data and determine to forward the non-voice data to the Wi-Fi® radio 210 for transmission.

The LTE radio 206 and the Wi-Fi® radio 210 may transmit and receive at similar operating frequencies, which can cause coexistence issues by producing local interference on one radio's reception due to the other radio's concurrent transmission. For example, if the Wi-Fi® radio 210 operates within a 2.4 Ghz frequency band and the LTE radio 206 operates within any one of the available LTE frequency bands (e.g., B7, B40, B41) that is assigned a similar frequency (e.g., 2.3 GHz, 2.5 GHz, or 2.6 Ghz), the transmission from one of the radios 206, 210 might interfere with the reception at the other one of the radios 206, 210. The radio manager 222 determines when the transmission from one of the radios 206, 210 might interfere with the reception at the other one of the radios 206, 210 and sends information to the selector 334 to direct the selector 334 to consolidate one transmission with the other.

The selector 334 may receive input from the radio manager 222 that causes the selector 334 to cease using the Wi-Fi® radio 210 to transmit and receive the non-voice data on behalf of the non-voice application 220. The selector 334 can forward the non-voice data with the voice data for transmission by the LTE radio 206 alone, thereby eliminating any coexistence issues that existed from operating the Wi-Fi® radio 210 during a voice call over the LTE radio 206.

In other cases, the selector 334 may initially forward the voice data to the Wi-Fi® radio 210 for transmission when the selector 334 receives input from the radio manager 222. In response to the input from the radio manager 222, the selector 334 may cease using the LTE radio 206 to transmit and receive the non-voice data and rather, consolidate the non-voice data with the voice data for transmission by the Wi-Fi® radio 210 alone, and as such, preventing coexistence issues that may have existed in this example, from operating the LTE radio 206 and the Wi-Fi® radio 210 concurrently.

The radio manager 222 may execute a model 336 that is configured to determine when combinations of the radios 206, 208, 210, or 212 are likely to cause degrading local interference for voice calls. The model may be a machine-learned model, a parametric model, or some other type of model configured to determine, with a degree of confidence or a score, whether local interference will occur from a particular operating state of the radios 206, 208, 210, or 212.

The model 336 may be a machine-learned model or an artificial intelligence-based model that is trained from historical observations of local interference produced for various given radio configurations, to predict with a degree of confidence whether a current radio configuration will likely lead to local interference. The model 336 may be a neural network or other machine learned model.

The model may be a parametric model manually programmed to detect radio configurations of the radios 206, 208, 210, and 212 that are likely to interfere with each other. For example, the model 336 may execute rules specifying various combinations of data types, operating powers, operating frequencies, and such to utilize or to avoid local interference. The model 336 may execute rules to avoid various combinations of data types, operating powers, operating frequencies, and such that are likely to cause local interference. The radio manager 222 executes the rules to direct the selector 334 to implement the local interference avoidance process.

Example Procedures

Figure 4:
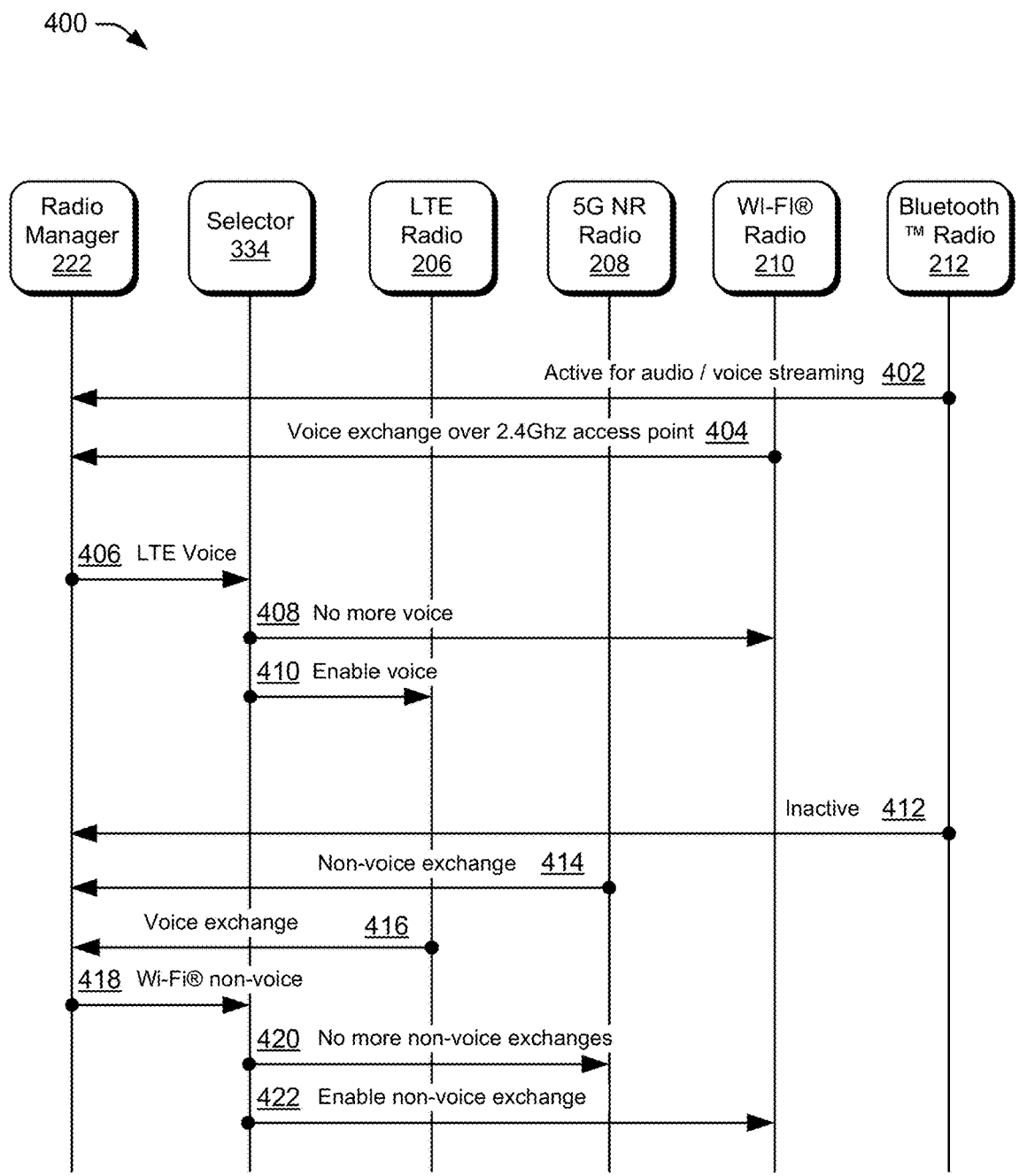
FIG. 4 illustrates a transaction diagram of components of a computing device implementing local interference avoidance.

FIG. 4 illustrates a transaction diagram of components of a computing device implementing local interference avoidance. The radio manager 222, the selector 334, the LTE radio 206, the 5G NR radio 208, the Wi-Fi® radio 210, and the Bluetooth™ radio 212 are the same, as previously described in FIG. 3. FIG. 4 illustrates two examples of local interference avoidance and is described in the context of the preceding FIGS.

In a first example, the computing device 110 is outputting audio data via the Bluetooth™ radio 212 while concurrently exchanging voice data over the Wi-Fi® radio 210, e.g., for a voice or video call. Responsive to determining that the Wi-Fi® radio 210 is exchanging voice data while the Bluetooth™ radio 212 is exchanging non-voice data, the radio manager 222 may direct the selector 334 to avoid local interference between the Wi-Fi® radio 210 and the Bluetooth™ radio 212 by switching from using the Wi-Fi® radio 210 for exchanging the voice data to using a different radio to exchange the voice data.

For example, at 402, and 404, via an interface the radio manager 222 shares directly, or indirectly, with the radios 212 and 210 (e.g., interface 328), the radio manager 222 receives configuration information about the radios 210 and 212, respectively, to determine active status and characteristics of wireless connections maintained by the radios 210 and 212. Based on the information received at 402 and 404, the radio manager 222 may infer that the Bluetooth™ radio 212, while actively streaming audio data in the frequency band of Bluetooth™, is generating local interference on the wireless connection maintained by the Wi-Fi® radio 210, when operating in a similar frequency band as the frequency band for Bluetooth™ (e.g., 2.4 GHz).

In some cases, the radio manager 222 performs ongoing monitoring of changes to the radio configurations to dynamically apply interference avoidance techniques as needed. The radio manager 222 may receive information via interface 328, for example, Bluetooth™ and Wi-Fi® configurations (e.g., synchronous connection-oriented settings, radio settings), as well as Bluetooth™ and Wi-Fi® link metrics (e.g., received signal strength indicators, power settings). The radio manager 222 may receive information at 402 and 404 and dynamically strengthen or reduce biasing signals to control the selector 334.

At 406, the radio manager 222 biases the selector 334 to be more likely to conduct the voice or video call using the LTE radio 206, rather than the Wi-Fi® radio 210 currently used. For example, the radio manager 222 may set a flag or other variable that causes the selector 334 to automatically switch from using the Wi-Fi® radio 210 to exchange voice data to using the LTE radio 206 instead for exchanging the voice data. At 408, the selector 334 directs the Wi-Fi® radio 210 to cease transmitting the voice data and at 410, the selector 334 directs the LTE radio 206 to take over transmitting the voice data.

In a second example, the computing device 110 has ceased outputting audio data via the Bluetooth™ radio 212. At 412, the radio manager 222 receives information via interface 328 indicating the Bluetooth™ radio 212 is inactive. At 414, and 416, the radio manger receives information from the 5G NR radio 208, and the LTE radio 206 indicating that the 5G NR radio 208 is transmitting non-voice data from the non-voice application 220 while the LTE radio 206 is exchanging voice data for a voice or video call.

The radio manager 222 will determine that coexistence issues may occur between the LTE radio 206 and the 5G NR radio 208, due to intermodulation between LTE and 5G NR signals. The radio manager 222 may therefore move the non-voice data exchange from the 5G NR radio 208 to the Wi-Fi® radio 210, thereby preventing the coexistence issue.

At 418, the radio manager 222 biases the selector 334 to place the non-voice data exchange on to a wireless connection controlled by the Wi-Fi® radio 210. At 420 the selector 334 pauses the non-voice data exchange at the 5G NR radio 208 and at 422, the selector 334 resumes the non-voice data exchange at the Wi-Fi® radio.

In either example, the radio manager 222 may improve the link quality of the voice data transmission. As such, the radio manager 222 may bias the selector 334 into using the radios 206, 208, 210, and 212 to avoid local interference.

Figure 5:
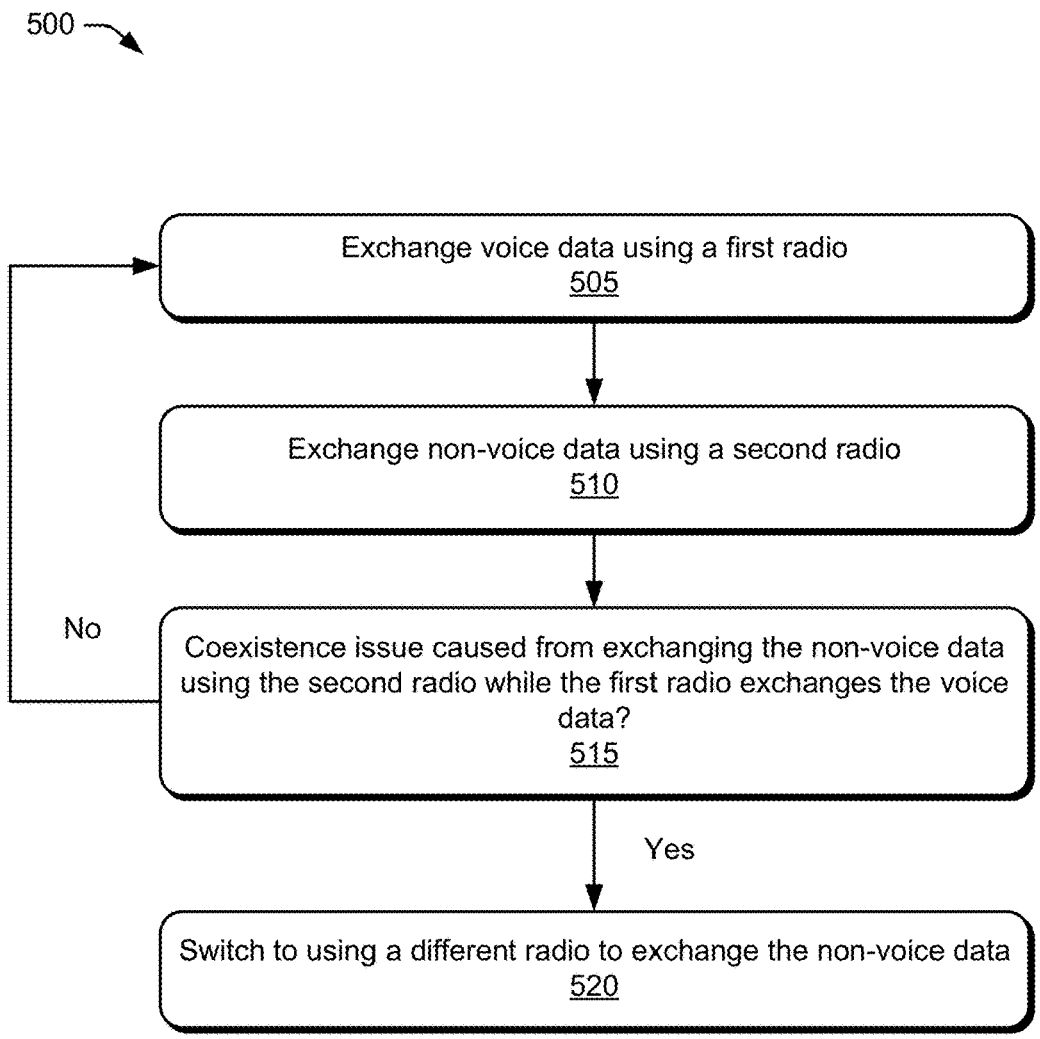
FIG. 5 illustrates an example process implemented by a computing device when performing local interference avoidance.

FIG. 5 illustrates an example process implemented by a computing device when performing local interference avoidance. The computing device in the example of FIG. 5 is the computing device 110, as previously described. The computing device 110 may execute the operations 500 in a different order and with additional or fewer operations than as shown in FIG. 5. And, of course, more than one computing device may be involved and the operations may change over time to handle different local interference situations.

At 505, the computing device 110 exchanges voice data using a first radio. For example, a processor of the computing device 110 may execute instructions for implementing the selector 334. The selector 334 may exchange voice data on behalf of the voice application 218 using any of the radios 206, 208, 210, or 212.

Similarly, at 510, the computing device 110 exchanges non-voice data using a second radio (different from the first radio). The selector 334 may exchange the non-voice data on behalf of the non-voice application 220 using a different one of the radios 206, 208, 210, or 212.

At 515, the computing device 110 determines whether any coexistence issues are caused from exchanging the non-voice data using the second radio while the first radio exchanges the voice data. For example, based on determining that sending the voice data using the first radio concurrently with exchanging the non-voice data using the second radio produces the local interference between the first and second radios, the radio manager 222 may configure the selector 334 to avoid the local interference between the first and second radios by biasing the selector 334 to switch from using the second radio to using a different radio to exchange the non-voice data.

For example, the radio manager 222 may execute a model configured to determine circumstances when combinations of the radios 206, 208, 210, or 212 are likely to cause local interference and degrade link quality, particularly for voice calls. The model may be a machine-learned model trained on historical data indicative of what configurations of the radios 206, 208, 210, or 212, or other similar configurations of other computing devices, produced local interference. The model may be manually programmed to detect when the radios 206, 208, 210, and 212 are likely to interfere with each other, e.g., by executing rules specifying various combinations of data types, operating powers, operating frequencies, and such to utilize and to avoid local interference. The radio manager 222 executes the rules to direct the selector 334 to implement the local interference avoidance process.

Clause 1. A method for avoiding local interference between first and second radios of a computing device, the method comprising: exchanging, by at least one processor of the computing device and using the first radio, voice data; exchanging, using the second radio, non-voice data; and based on determining that exchanging the voice data using the first radio concurrently with exchanging the non-voice data using the second radio produces the local interference between the first and second radios, avoiding the local interference between the first and second radios by switching from using the second radio to using a different radio to exchange the non-voice data.

Clause 2. The method of clause 1, wherein the different radio comprises the first radio or a third radio that is different than the first and second radios.

Clause 3. The method of any of clauses 1-2, further comprising: determining the local interference between the first and second radios based on configuration settings of the first radio or the second radio.

Clause 4. The method of any of clauses 1-3, further comprising: determining the local interference between the first and second radios based on scheduling information of the first radio or the second radio.

Clause 5. The method of any of clauses 1-4, wherein: the first radio is a Wi-Fi® radio and the second radio is a cellular radio; or the second radio is the Wi-Fi® radio and the first radio is the cellular radio.

Clause 6. The method of any of clauses 1-5, The method of clause 1, further comprising: responsive to determining that the first radio is a Wi-Fi® radio exchanging the voice data and the second radio is a Bluetooth™ radio exchanging the non-voice data: refraining from switching from using the second radio to using the different radio to exchange the non-voice data; and avoiding the local interference between the first and second radios by switching from using the first radio to using the different radio to exchange the voice data.

Clause 7. The method of clause 6, wherein the different radio is a Long-Term Evolution (LTE) radio.

Clause 8. The method of any of clauses 1-7, wherein the first radio is a Long-Term Evolution (LTE) radio, the second radio is a Fifth Generation New Radio (NR), and the different radio is a Wi-Fi® radio.

Clause 9. A computing device comprising: a first radio; a second radio; and a processor and memory system coupled to the first and second radios, the processor and memory system comprising instructions that are executable by the processor to configure the computing device to avoid local interference between first and second radios by: exchanging, using the first radio, voice data; exchanging, using the second radio, non-voice data; and based on determining that sending the voice data using the first radio concurrently with exchanging the non-voice data using the second radio produces the local interference between the first and second radios, avoiding the local interference between the first and second radios by switching from using the second radio to using a different radio to exchange the non-voice data.

Clause 10. The computing device of clause 9, wherein the different radio comprises the first radio or a third radio of the computing device that is different than the first and second radios.

Clause 11. The computing device of any of clauses 9-10, wherein the instructions are further executable by the processor to configure the computing device to avoid the local interference between the first and second radios by determining the local interference between the first and second radios based on configuration settings of the first radio or the second radio.

Clause 12. The computing device of any of clauses 9-11, wherein the instructions are further executable by the processor to configure the computing device to avoid the local interference between the first and second radios by determining the local interference between the first and second radios based on one or more signal quality metrics of the first radio or the second radio.

Clause 13. The computing device of any of clauses 9-12, wherein: the first radio is a Wi-Fi® radio and the second radio is a Long-Term Evolution (LTE) radio; or the second radio is the Wi-Fi® radio and the first radio is the LTE radio.

Clause 14. The computing device of any of clauses 9-13, wherein the instructions are further executable by the processor to configure the computing device to avoid the local interference between the first and second radios by: responsive to determining that the first radio is a Wi-Fi® radio exchanging the voice data and the second radio is a Bluetooth™ radio exchanging the non-voice data: refraining from switching from using the second radio to using the different radio to exchange the non-voice data; and avoiding the local interference between the first and second radios by switching from using the first radio to using the different radio to exchange the voice data.

Clause 15. The computing device of clause 14, wherein the different radio is a Long-Term Evolution (LTE) radio.

Clause 16. The computing device of any of clauses 9-15, wherein the first radio is a Long-Term Evolution (LTE) radio, the second radio is a Fifth Generation New Radio (NR), and the different radio is a Wi-Fi® radio.

Clause 17. A computer-readable storage medium comprising instructions, that, when executed by a processor of a computing device, configure the computing device to avoid local interference between first and second radios of the computing device by: exchanging, using the first radio, voice data; exchanging, using the second radio, non-voice data; and based on determining that sending the voice data using the first radio concurrently with exchanging the non-voice data using the second radio produces the local interference between the first and second radios, avoiding the local interference between the first and second radios by switching from using the second radio to using a different radio to exchange the non-voice data.

Clause 18. The computer-readable storage medium of clause 17, wherein the different radio comprises the first radio or a third radio of the computing device that is different than the first and second radios.

Clause 19. The computer-readable storage medium of any of clauses 17-18, wherein the instructions are further executable by the processor to configure the computing device to avoid the local interference between the first and second radios by determining the local interference between the first and second radios based on configuration settings of the first radio or the second radio and based on scheduling information of the first radio or the second radio.

Clause 20. The computer-readable storage medium of any of clauses 17-19, wherein: the first radio is a Wi-Fi® radio and the second radio is a Long-Term Evolution (LTE) radio; or the second radio is the Wi-Fi® radio and the first radio is the LTE radio.

Clause 21. A computing device comprising at least one processor configured to perform any of the methods of clauses 1-8.

Clause 22. A computing device comprising means for performing any of the methods of clauses 1-8.

Clause 23. A computer-readable storage medium comprising instructions that, when executed, cause at least one processor of a computing device to perform any of the methods of clauses 1-8. Generally, any of the components, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Conclusion

Although techniques and devices for enabling local interference avoidance have been described in language specific to features and/or methods, it is to be understood that the subject of the appended claims is not necessarily limited to the specific features or methods described. Rather, the specific features and methods are disclosed as example implementations for enabling local interference avoidance.

What is claimed is:

1. A method for avoiding local interference between a first radio transceiver and a second radio transceiver of a computing device that includes a processor, the method comprising:
   exchanging, by the first radio transceiver, voice data;
   exchanging, by the second radio transceiver, non-voice data; and
   based on determining, by the processor, that concurrently operating the first radio transceiver and the second radio transceiver to exchange the voice data and the non-voice data produces the local interference, avoiding the local interference by at least one of switching from using the second radio transceiver to using a different radio transceiver to exchange the non-voice data or switching from using the first radio transceiver to using the different radio transceiver to exchange the voice data.

2. The method of claim 1, wherein the different radio transceiver comprises a third radio transceiver that is different than the first radio transceiver and the second radio transceiver.

3. The method of claim 1, further comprising:
   determining the local interference based on configuration settings of the first radio transceiver or the second radio transceiver.

4. The method of claim 1, further comprising:
   determining the local interference based on scheduling information of the first radio transceiver or the second radio transceiver.

5. The method of claim 1, wherein:
   the first radio transceiver is a Wi-Fi® radio transceiver and the second radio transceiver is a cellular radio transceiver; or
   the second radio transceiver is the Wi-Fi® radio transceiver and the first radio transceiver is the cellular radio transceiver.

6. The method of claim 1, further comprising:
   responsive to determining that the first radio transceiver is a Wi-Fi® radio transceiver exchanging the voice data and the second radio transceiver is a Bluetooth® radio transceiver exchanging the non-voice data:
      refraining from switching from using the second radio transceiver to using the different radio transceiver to exchange the non-voice data; and
      avoiding the local interference by switching from using the first radio transceiver to using the different radio transceiver to exchange the voice data.

7. The method of claim 6, wherein the different radio transceiver is a Long-Term Evolution (LTE) radio transceiver.

8. The method of claim 1, wherein the first radio transceiver is a Long-Term Evolution (LTE) radio, the second radio transceiver is a Fifth Generation New Radio (NR) radio transceiver, and the different radio transceiver is a Wi-Fi® radio transceiver.

9. The method of claim 1, wherein avoiding the local interference comprises determining the local interference based on configuration settings of the first radio transceiver or the second radio transceiver.

10. The method of claim 1, wherein avoiding the local interference comprises determining the local interference based on one or more signal quality metrics of the first radio transceiver or the second radio transceiver.

11. A computing device comprising:
   a processor;
   a first radio transceiver;
   a second radio transceiver; and
   a non-transitory computer-readable storage media (CRM) having stored thereon instructions that, responsive to execution by the processor, cause the processor to perform operations comprising:
      exchange, by the first radio transceiver, voice data;
      exchange, by the second radio transceiver, non-voice data;
      responsive to determining that concurrently operating the first radio transceiver and the second radio transceiver to the exchange of the voice data and the non-voice data produces a local interference between the first radio transceiver and the second radio transceiver, the instructions cause the processor to execute further operations to avoid the local interference by at least one of:

switching from using the second radio transceiver to using a different radio transceiver to exchange the non-voice data; or switching from using the first radio transceiver to using the different radio transceiver to exchange the voice data.

12. The computing device of claim 11, wherein the different radio transceiver comprises a third radio transceiver.

13. The computing device of claim 11, wherein the instructions cause the processor to execute further operations to:

determine the local interference based on configuration settings of the first radio transceiver or the second radio transceiver.

14. The computing device of claim 11, wherein the instructions cause the processor to execute further operations to:

determine the local interference based on scheduling information of the first radio transceiver or the second radio transceiver.

15. The computing device of claim 11, wherein the first radio transceiver comprises a Wi-Fi® radio transceiver and the second radio transceiver comprises a cellular radio transceiver, or wherein the second radio transceiver comprises the Wi-Fi® radio transceiver and the first radio transceiver comprises the cellular radio transceiver.

16. The computing device of claim 11, wherein the first radio transceiver comprises a Wi-Fi® radio transceiver, wherein the second radio transceiver comprises a Bluetooth® radio transceiver, and wherein the instructions cause the processor to execute further operations to:

refrain from switching from using the second radio transceiver to using the different radio transceiver to exchange the non-voice data; and avoid the local interference by switching from using the first radio transceiver to using the different radio transceiver to exchange the voice data.

17. The computing device of claim 16, wherein the different radio transceiver comprises a Long-Term Evolution (LTE) radio transceiver.

18. The computing device of claim 11, wherein the first radio transceiver comprises a Long-Term Evolution (LTE) radio transceiver, wherein the second radio transceiver comprises a Fifth Generation New Radio (NR) radio transceiver, and wherein the different radio transceiver is a Wi-Fi® radio transceiver.

19. The computing device of claim 11, wherein switching from using the second radio transceiver to using a different radio transceiver further comprises:

determining the local interference based on configuration settings of the first radio transceiver or the second radio transceiver.

20. The computing device of claim 11, wherein switching from using the second radio transceiver further comprises:

determining the local interference based on one or more signal quality metrics of the first radio transceiver or the second radio transceiver.

* * * * *

UNITED STATES PATENT AND TRADEMARK OFFICE
CERTIFICATE OF CORRECTION

PATENT NO. : 11,902,847 B2
APPLICATION NO. : 17/294971
DATED : February 13, 2024
INVENTOR(S) : Jibing Wang et al.

Page 1 of 1

It is certified that error appears in the above-identified patent and that said Letters Patent is hereby corrected as shown below:

In the Claims

At Column 14 Line 62, Claim 1, please correct "to the exchange of the voice data" to be --to exchange the voice data--

Signed and Sealed this
Third Day of September, 2024

Katherine Kelly Vidal
*Director of the United States Patent and Trademark Office*